Oct. 9, 1923.
T. W. E. BROGDEN
1,470,424
SPRINGING OF ROAD VEHICLES AND THE LIKE
Filed Feb. 6, 1923   2 Sheets-Sheet 1
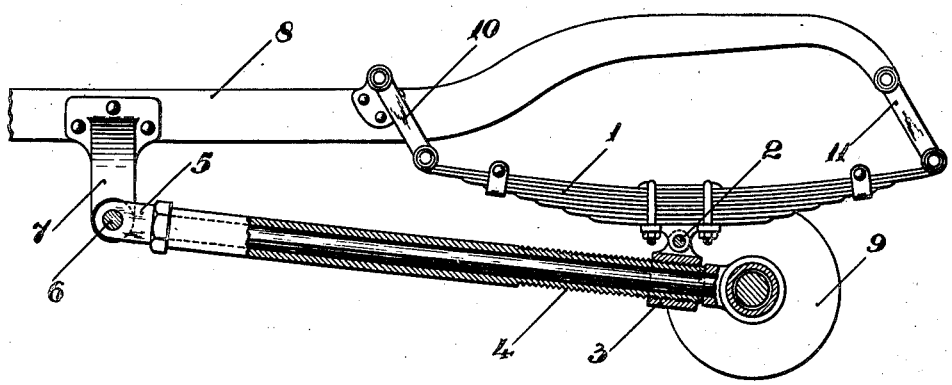
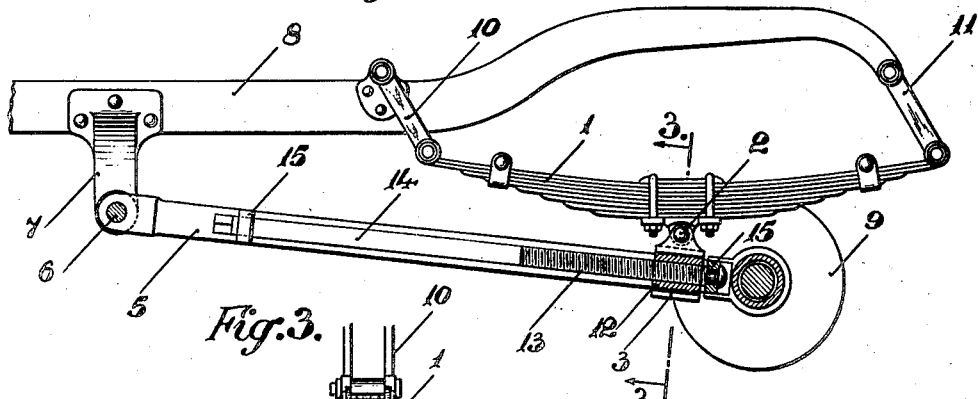
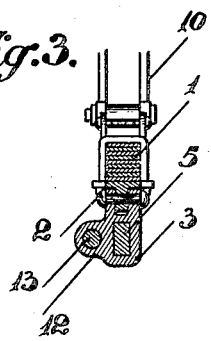
Inventor
Thomas W. E. Brogden
By
Attorney Oct. 9, 1923.
T. W. E. BROGDEN
1,470,424
SPRINGING OF ROAD VEHICLES AND THE LIKE
Filed Feb. 6, 1923   2 Sheets-Sheet 2
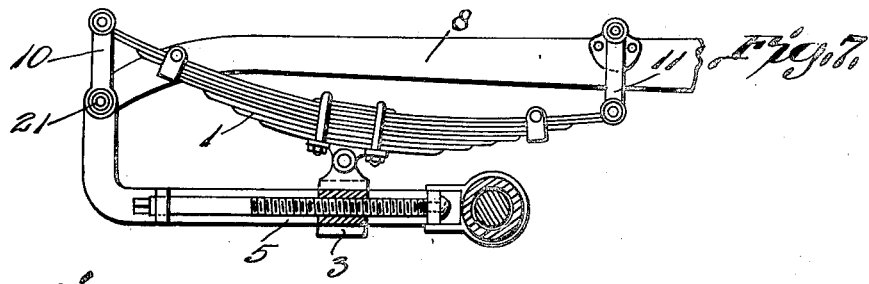
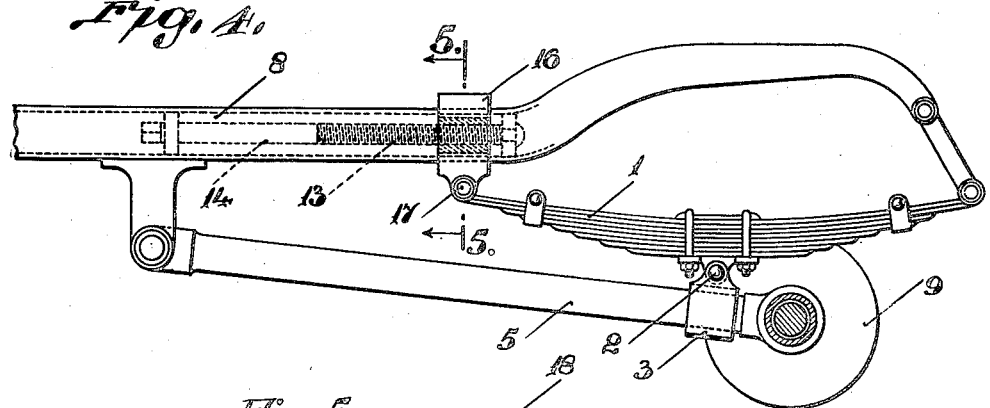
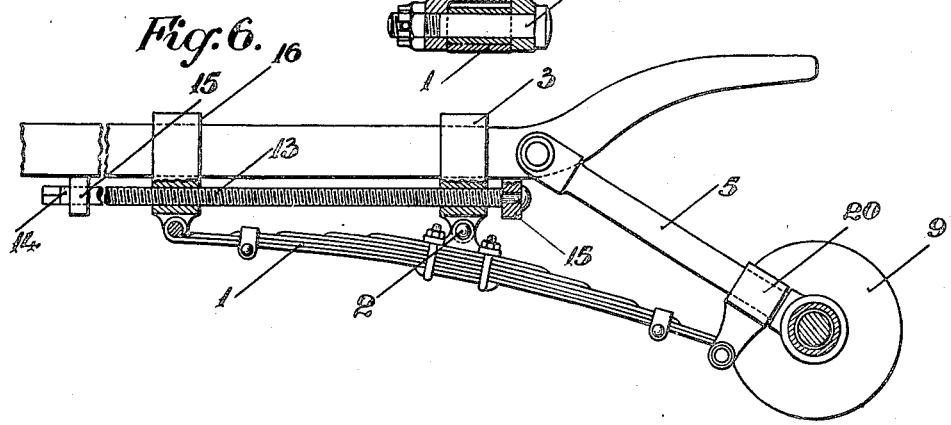
Inventor
Thomas W. E. Brogden
By
Attorney, Patented Oct. 9, 1923.

1,470,424

UNITED STATES PATENT OFFICE.

THOMAS WILLIAM EDWIN BROGDEN, OF DUNGANNON, IRELAND.

SPRINGING OF ROAD VEHICLES AND THE LIKE.

Application filed February 6, 1923. Serial No. 617,279½.

*To all whom it may concern:*

Be it known that I, THOMAS WILLIAM EDWIN BROGDEN, subject of the King of Great Britain, residing at Dungannon, county Tyrone, Ireland, have invented certain new and useful Improvements in or Relating to the Springing of Road Vehicles and the like, of which the following is a specification.

This invention relates to spring suspension for road vehicles and the like and has for its object to provide an improved method of spring suspension which is capable of being readily adjusted for different loads, the said adjustment being effected either by hand or automatically, the hand adjustment being capable of being made, if desired, from the vehicle whilst the same is in motion.

It is proposed to attain this object by varying the leverage through which the shock acting on the road wheel is transmitted to the spring.

In the application of the invention to a road vehicle, in which the springs are disposed longitudinally, the wheel axle is preferably connected to radius rods hinged to the vehicle chassis, whilst the spring at each side of the vehicle is mounted upon, or connected to a slide operated by a screw-rod or other means whereby the slide and spring may be moved nearer to or further away from the point about which the wheel axle turns, so that the leverage through which the shock acts on the spring may be varied. By making it possible to adjust the springs according to the load in this manner the life of the vehicle may be increased as the shocks to which the vehicle is subjected may be minimized.

Figure 1 of the accompanying drawings shows the application of the invention to the rear semi-elliptic springs of a motor vehicle.

Figure 2 shows a modified arrangement, also shown applied to the rear semi-elliptic springs of a motor vehicle.

Figure 3 is a cross-section on the line 3—3, Figure 2, upon a larger scale.

Figure 4 represents a further method of effecting the adjustment of the spring.

Figure 5 is a section on the line 5—5, Figure 4, also upon a larger scale.

Figure 6 shows the invention applied to the rear compensated cantilever springs of a motor vehicle, Figure 7 represents the application of the invention to the front semi-elliptic springs of a motor vehicle.

The same reference numerals indicate corresponding parts in each of the figures.

Referring to Figure 1 of the drawings, which shows the invention as applied to the rear semi-elliptic springs of a motor vehicle, each spring 1 is pivoted at its middle at 2 to a slide 3, the latter being in the form of a short internally screw-threaded tube which is engaged by an externally threaded sleeve 4. This sleeve 4 is fitted upon a radius rod 5 so as to be capable of being rotated upon the latter, but prevented from moving endwise upon same. The forward end of the radius rod 5 is pivoted at 6 to a depending lug 7 rigidly carried by the side 8 of the chassis of the vehicle, whilst the rear end of the radius rod is rigidly fixed to the respective end of the back axle casing 9; or it may carry a bearing within which the respective end of the back axle engages. The forward and rear ends of the spring 1 are connected to the side of the chassis by shackles 10 and 11 respectively. These shackles are preferably longer than those usually employed to admit of a wide range of movement of the spring 1 in a longitudinal direction. The said spring 1 is adapted to be moved longitudinally in a direction away from or towards the road wheels and back axle casing 9 according to the load to which the spring is to be subjected. This movement of the spring is effected by rotating the sleeve 4 about the radius rod. The slide 3 is thus caused to move axially upon the sleeve 4 either towards or away from the back axle according to the direction in which the sleeve 4 is turned. The spring 1 is consequently also caused to move in a longitudinal direction away from or towards the back axle. The said sleeve 4 may be rotated to adjust the position of the spring in any suitable manner. It may, for instance, be provided with a nut whereby it may be turned by a spanner. Preferably, however, it is caused to be rotated by a bobbin and cable, or by a Bowden wire, which may, if desired, be operated from the driver's seat, so that the position of the spring may be adjusted whilst the vehicle is in motion. By moving the spring in a forward direction away from the wheel and back axle 9 the leverage through which the shock, acting on the wheel, is transmitted to the spring is increased, whereas by moving the spring in a direction towards the back axle the leverage through which the shock acts is decreased. The position of the spring may thus be readily adjusted for different loads, the spring being moved in a direction towards the back axle as the load is increased. Where the propeller shaft is enclosed within a torque tube the radius rod carrying the spring at each side of the vehicle is hinged at its forward end in line with the universal joint at the forward end of the torque tube. The sleeve 4 may, if desired, be formed with a double or multiple thread so that the rotation of the sleeve quickly draws the spring into the required adjusted position also, instead of the radius rod being hinged to a depending lug upon the chassis its forward end may be cranked upwards and pivoted directly to the side of the chassis itself.

A further method of effecting an axial movement of the slide 3 upon the radius rod 5 is shown in Figures 2 and 3. In this arrangement the said slide 3 is provided with a plain axial hole of a rectangular shape and is mounted directly upon the radius rod 5 which is of a rectangular section, as shown in Figure 3, so that the said slide may move axially upon the radius rod but is prevented from turning about the latter. The said slide 3 is formed with a lug 12 at one side having a tapped hole which is engaged by the externally threaded portion 13 of a rod 14 mounted in bearings 15 carried by the radius rod. The rod 14 is adapted to be rotated by a Bowden wire or other means thus actuating the slide 3, and moving the spring 1 in a longitudinal direction towards or away from the rear wheel or back axle. The radius rod 5 may be of any suitable cross-sectional shape which will prevent the slide turning thereon, the slide having an axial hole of a corresponding shape. The said slide may be formed in two parts bolted together to facilitate assembling. The rod 14 may, if desired, be connected to a further rod extending to the driver's seat, a universal joint or flexible coupling connecting the two rods.

In the arrangement shown in Figures 4 and 5 of the drawings the spring 1 is pivoted at its middle to the slide 3 which is mounted directly upon the radius rod 5 so as to be capable of sliding axially thereon. The longitudinal movement of the spring away from or towards the rear wheel is however, effected by a slide 16 hinged by a shackle pin 17 to the forward end of the said spring, the said slide 16 embracing the angle iron member 8 of the chassis and adapted to be moved endwise thereon by the rod 14. This rod is externally screwed at 13 for a portion of its length, as above described, the screwed portion engaging with a tapped hole in the slide 16 (see Figure 5). Thus by rotating the rod 14, which may be done by any suitable means the slide 16 may be moved along the side 8 of the chassis and the slide 3 moved along the radius rod, so that the spring 1 is moved away from or towards the back axle or rear wheel, thus varying the leverage through which the shock acts on the said spring. The slide 16 is formed in two parts adapted to embrace the angle iron members of the chassis, as shown in Figure 5, the two parts being secured together by screws 18, or by other means. The lower portion of the two said parts carries the shackle pin 17 for connection to the forward end of the spring. The slide 16 may be of any other suitable construction if desired.

Figure 6 shows the application of the invention to a motor vehicle provided at the rear with compensated cantilever leaf springs. The spring 1 is hinged at its middle at 2, to a slide 3 embracing the angle iron member 8 of the chassis and adapted to be moved longitudinally thereon. The rear end of the spring is hinged to a slide 20 free to move upon the radius rod 5 connecting the back axle to the chassis, whilst the forward end of the spring is hinged to a slide 16 adapted to move upon the angle iron member 8 of the chassis. Both the slide 3 and the slide 16 are adapted to be moved along the angle iron member of the chassis by the rotation of a single rod 14 having externally threaded portions 13 engaging tapped holes in the said slides 3 and 16, the rod being supported in bearings 15, as shown. The spring 1 may thus be moved longitudinally by the rod 14, away from or towards the back axle, the slides 3 and 16 moving upon the angle iron member 8, whilst the slide 20, to which the rear end of the spring is pivoted, is moved along the radius rod 5. It may be arranged so that one only of the slides 3 and 16 is moved by the rotation of the rod 14, if desired. In the arrangement shown the radius rod 5 is hinged to the chassis at a point rearwards of the middle of the spring 1. It may, however, if desired, be hinged to the chassis at a point in front of the forward end of the spring.

Figure 7 shows the application of the invention to the front springing of a motor vehicle having semi-elliptic springs.

In this arrangement the radius rod 5 is hinged at its rear end to the front wheel axle, and is jointed at its forward end to the dumb iron or side 8 of the chassis by means of a pin or bolt 21. The spring 1 is hinged at the middle to the slide 3 which is adapted to be moved along the radius rod 5 by a screwed rod, or by any other suitable means.

The rear end of the spring is jointed to a shackle 11, whilst the forward end of the spring is hinged to a shackle 10 pivoted at its lower end to the pin or bolt 21. The spring may thus be moved longitudinally in a similar manner to the previously described arrangements, so that the leverage through which the shock acts may be varied according to the load.

The invention may be applied to quarter elliptic and full elliptic springs, and also to coiled compression or tension springs, and to volute coiled springs. It may, in fact, be applied to any form of spring suspension, so as to admit of the leverage through which the shock transmitted to the spring acts being varied according to the load. Any suitable means may be employed for adjusting the position of the slide to which the spring is attached.

Having fully described my invention, what I desire to claim and secure by Letters Patent is:—

1. An adjustable spring suspension for vehicles comprising a load-supporting spring mounted to shift bodily in a direction longitudinally of the chassis of the vehicle, a pivoted member against which the spring bears and which transmits the load from the spring to an axle of the vehicle, and a slide connected to the spring and shiftable relatively to the chassis to shift the spring longitudinally of the vehicle and thus alter the distance between the pivotal center of said member and the point at which the spring bears on said member, thereby varying the leverage through which the shocks acting on the axle are transmitted to the spring.

2. An adjustable spring suspension for vehicles comprising a load-supporting spring mounted to shift bodily in a direction longitudinally of the chassis of the vehicle, a lever forming a pivotal connection between the chassis and an axle of the vehicle, the spring bearing on said lever, and the lever transmitting the load from the spring to the axle, and means for shifting the spring longitudinally of the chassis to alter the position of the point at which the spring bears on said lever relatively to the pivotal center of the lever, thereby varying the leverage through which shocks are transmitted from the axle to the spring.

3. An adjusting spring suspension for vehicles comprising a radius rod pivotally connecting the chassis and the axle of the vehicle, a load-supporting leaf spring capable of shifting bodily in a direction longitudinally of the chassis of the vehicle and bearing on the radius rod, and means for shifting the spring bodily in a direction longitudinally of the chassis to alter the point at which it bears on the radius rod, thereby varying the leverage through which shocks are transmitted from the axle to the spring.

4. Means for adjusting vehicle springs, comprising a slide member connected to the middle portion of the spring and mounted on a radius member connecting the road wheel to the vehicle chassis, the said slide having an internally threaded hole; a link connecting an end of the spring to the vehicle chassis; and an externally screwed member engaging the internally threaded hole in the slide, and adapted, on being turned, to vary the position of the slide, and so vary the leverage through which the shock acting on the road wheel is transmitted to the spring.

5. Means for adjusting vehicle springs, comprising; a slide member connected to the middle portion of the spring and mounted on a radius member connecting the road wheel to the vehicle chassis, and a member connecting the one end of the spring to the vehicle chassis, one of said members having an internally screwed hole; a link connecting the other end of the spring to the vehicle chassis; and an externally screwed member engaging the screwed hole in said screwed member and adapted, on being turned, to vary the position of the slide member, and so vary the leverage through which the shock acting on the road wheel is transmitted to the said spring.

In testimony whereof I have hereunto set my hand in presence of two subscribing witnesses.

THOMAS WILLIAM EDWIN BROGDEN.

Witnesses:
M. MICALEY,
R. S. SECCHIOL.